HOPPER LIP SERRATIONS
5 MIL DEPTH 56/INCH
5 MILS
18 MILLS

CAST FILM PEAKS REDUCED
50/1 FROM HOPPER 17 MILS
THICKNESS
17 MILS
0.1 MIL

LONGITUDINALLY
STRETCHED FILM
5.0 MILS THICKNESS
15 MILS
0.04 MILS 0.04 MILS
60 MILS
BIAXIALLY STRETCHED FILM
1.5 MILS THICKNESS

INVENTOR
HAROLD B. WHITFIELD
BY
ATTORNEY

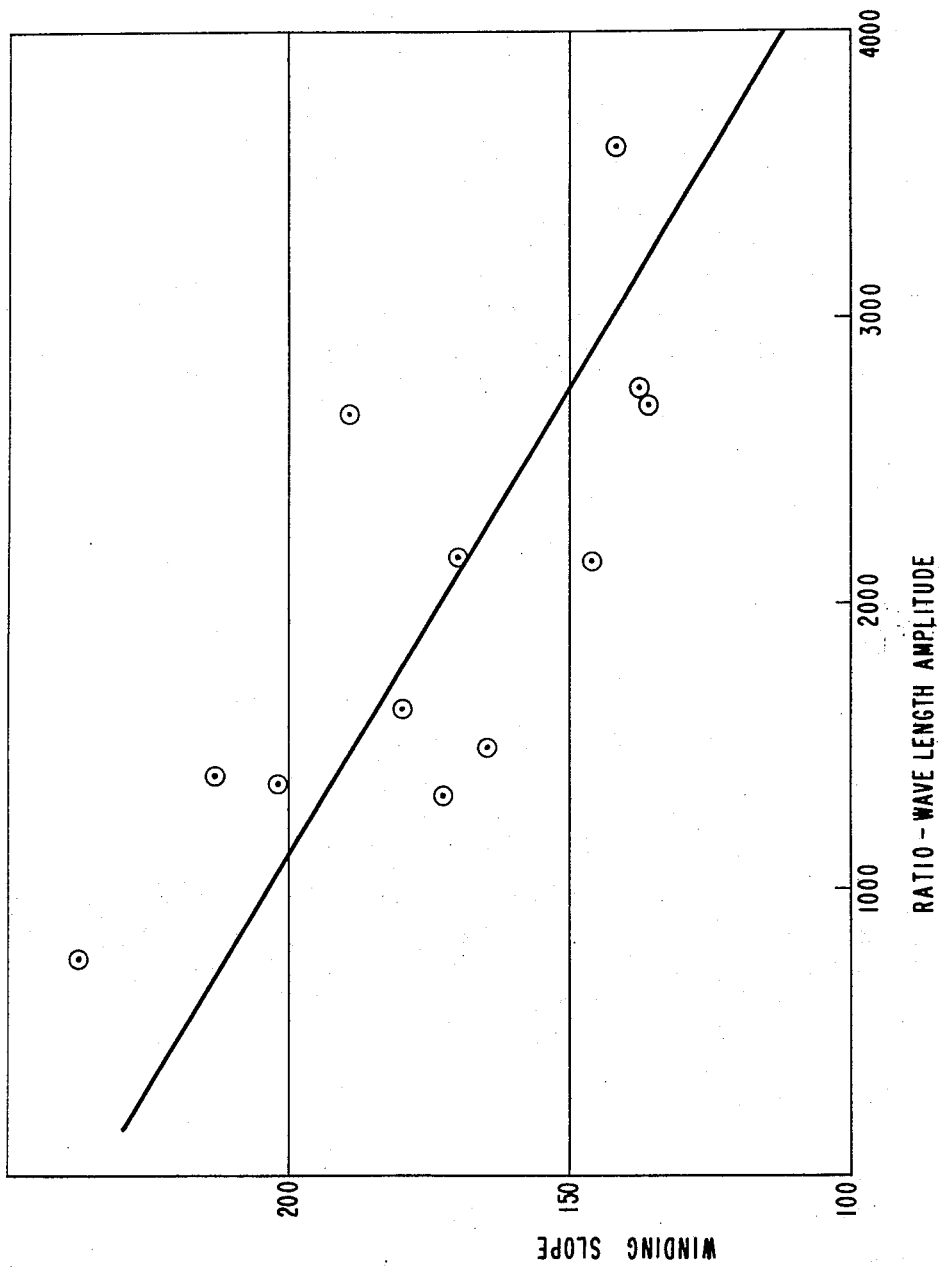

United States Patent Office 3,707,431
Patented Dec. 26, 1972

3,707,431
FILM STRUCTURE HAVING UNDULATING SURFACE
Harold Barnard Whitfield, Jr., Circleville, Ohio, assignor to E. I. du Pont de Nemours and Company, Wilmington, Del.
Continuation-in-part of abandoned application Ser. No. 782,686, Dec. 10, 1968. This application Jan. 19, 1971, Ser. No. 108,160
Int. Cl. B32b 3/00
U.S. Cl. 161—123
7 Claims

ABSTRACT OF THE DISCLOSURE

A thermoplastic film oriented by biaxial stretching having a nominal thickness of 5 mils or less and transversely repeating undulations that form ridges and valleys extending longitudinally along the length of the film wherein the ratio of the wavelength to amplitude of the undulations is about 500–2000:1 and the amplitude is not greater than about 10% of the thickness of the film. These films have significantly improved winding characteristics and are particularly useful as a base film for manufacturing magnetic recording tapes.

CROSS REFERENCE TO RELATED CASE

This application is a continuation-in-part of U.S. patent application Ser. No. 782,686, filed Dec. 10, 1968, now abandoned.

BACKGROUND OF THE INVENTION

This invention relates to a thermoplastic film having improved winding characteristics and is particularly useful as a base film for manufacturing magnetic recording tapes.

In the commercial production of thermoplastic films, and in particular in the winding of these films onto rolls at the completion of their preparation, it is desirable to maximize the speed and tension at which the films are wound, while maintaining a well formed roll. Many problems are encountered in the course of the winding operation. For example, winding at low tension results in an unstable roll due to excess air entrainment in the finished roll. Conversely, rolls wound at high tension have little air trapped between layers of smooth film and tend to be exceptionally hard and have wrinkles or dimples in the surface of the finished roll. These wrinkles indicate the inability of the film layers to adjust to minor variations during the winding operation in the tension of the film, particularly at the interface of the oncoming film and the film roll. It has, therefore, been extremely difficult to obtain rolls having satisfactorily uniform surface characteristics while maintaining the winding operation at an economically acceptable speed.

Previously, various techniques have been used to modify the surface characteristics of the film being wound so as to entrap sufficient air between successive layers of the film to allow enough surface-to-surface adjustment for the formation of smooth, uniform rolls, and at the same time permit the use of a high enough tension in the rolling process to form a stable roll. The surfaces of the films have, accordingly, been modified by incorporation of particulate fillers in the film, as well as by brushing one surface of the finished film to impart microscopic surface irregularities. Still another technique used to modify surface characteristics involved the incorporation of a liquid which is a nonsolvent to the base film and subsequently flashing off the liquid from the finished film, thereby leaving a roughened surface.

The above methods, however, are often economically impractical because of the additional equipment or process steps involved. Further, when sufficient particulate filler is used to impart the degree of surface roughness necessary to obtain good winding characteristics, both surfaces of the film are roughened to the extent that the film product is unsuitable for specialized uses, such as a base film for magnetic recording tapes, where at least one exceptionally smooth surface is required for the purpose of receiving a magnetic coating. Rough spots on the surface cause magnetic coating irregularities leading to a loss of recording fidelity at the irregularity. Therefore, there is a need for a thermoplastic film having improved winding characteristics and at least one smooth surface making it particularly useful as a base film in manufacturing magnetic tapes.

SUMMARY OF THE INVENTION

Accordingly, the present invention provides a thermoplastic film having improved winding characteristics so that it can be wound at relatively high tensions and high speeds with good roll formation. In addition, the film has one smooth surface making it useful as a base film for manufacturing magnetic tape.

Specifically, the present invention provides a thermoplastic film oriented by biaxial stretching having a nominal thickness of 5 mils or less and transversely repeating undulations that form ridges and valleys extending longitudinally along the length of the film wherein the ratio of the wavelength to amplitude of the undulations is about 500–2000:1 and the amplitude is not greater than about 10% of the thickness of the film.

The instant invention further provides a process for the preparation of these films by extruding film-forming polymer onto a quench surface through an orifice having one serrated lip and, thereafter, biaxially orienting the film.

BRIEF DESCRIPTION OF THE DRAWINGS

FIG. 3 is a graphical illustration of the relationship between winding slope and the wavelength:amplitude ratio.

DESCRIPTION OF THE PREFERRED EMBODIMENTS

Figure 1:
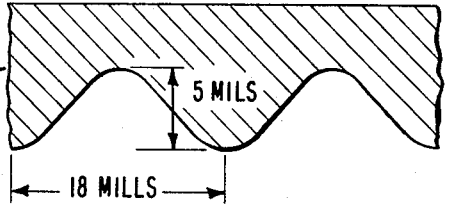
FIG. 1 is a cross-sectional representation of a typical film of the instant invention in various stages of its preparation.
Figure 1:
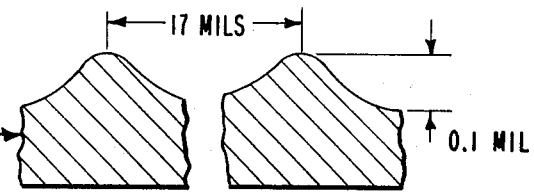
Figure 1:
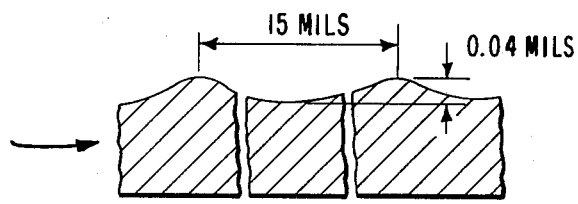
Figure 1:
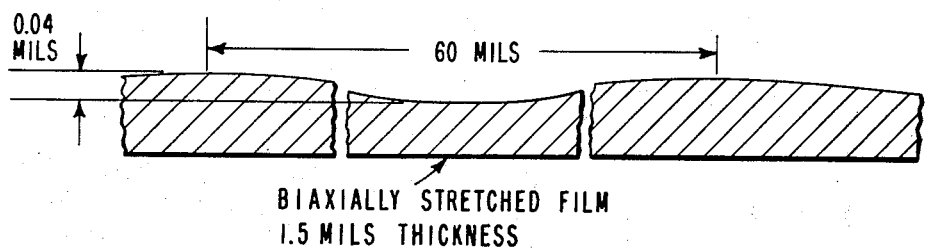

The films of the instant invention can be prepared from any thermoplastic film-forming material which is extrudable by conventional techniques. Such materials include, for example, polyesters such as polyethylene terephthalate; polyolefins, e.g., polyethylenes and polypropylenes; and polycarbonates, e.g., phosgene-bisphenol (A) condensation products, as well as blends and copolymers of two or more thermoplastic materials. The film can also comprise up to 400 to 1200 parts per million of particulate filler such as calcium carbonate, calcium phosphate, silica, and a lithium hydride derivative to modify the surface characteristics of the film, as well as other conventional additives such as pigments.

The films of the present invention have a nominal thickness of about 5 mils or less and undulations on one surface. The nominal thickness is the thickness of the film measured from the flat surface to the average height of the ridges and valleys. The wave pattern of the undulations is generally sinusoidal and runs in the transverse direction of the film strip observed by viewing a cross section and of the film taken transversely, i.e., across the width of the film. The ridges and valleys formed by the undulations extend longitudinally, that is, run the length of the film, create channels that (1) provide a passageway for entrapped air to escape as the film is wound and (2) reduce the area of contact between film surfaces on the wound roll.

The ratio of the wavelength to amplitude of the wave pattern of the undulations is about 500–2000:1 with the amplitude no greater than about 10% of the thickness of the film. Amplitude is used here in its conventional sense to mean the height of the wave peak above the valleys, or low points on the wave. The amplitude should be no greater than about 10% of the nominal thickness of the film, otherwise undulations begin to appear on the opposite surface of the film and this is generally undesirable, particularly if the film is to be used as a base film for magnetic tape.

The lower ratio of the wavelength to amplitude of about 500:1 is determined by practical considerations. Although it is desirable to obtain a low ratio of wavelength to amplitude, it is very difficult to produce a film by present film-forming techniques having a ratio of the wavelength to amplitude much below about 500:1 and an amplitude no greater than about 10% of the nominal thickness of the film without causing unwanted undulation on the smooth surface of the film.

The upper ratio of wavelength to amplitude of about 2000:1 is determined by the fact that little or no improvement in the winding slope of the film or the roll-forming characteristics is obtained at rates in excess of 2000:1.

The surface undulations are generally regular and uniform. However, the wavelengths and amplitudes of the undulations can be randomized, for example, to provide varying contact points for minute shifting of the roll structure during roll formation.

The films of the instant invention are made by simply extruding the film through an orifice of a conventional extrusion apparatus, the orifice being provided with one serrated edge. Film is extruded onto a cooled, moving, quenching surface and subsequently biaxially oriented.

The serrated edge at the extrusion orifice is placed on the side of the web opposite that which will come into contact with the quenching surface. The serrations of the extrusion lip are generally about from 1 to 10 mils deep with about from 50 to 200 serrations per inch and are generally present on the edge of the lip. It has been observed that the grooves imparted to the molten web upon extrusion are reduced in amplitude by a factor of about 50 between the initial extrusion and their contact with the cooled quench drum, simply due to the surface tension of the molten web. After cooling, the films are biaxially oriented by stretching, which orientation further reduces the amplitude and increases the wavelengths of the undulations resulting from extrusion through one serrated extrusion lip. The films are generally biaxially oriented from about 2.5 to 5 times in each of two mutually perpendicular directions, namely, the longitudinal direction of the film which is sometimes referred to as the "machine direction" and the latitudinal direction which is sometimes referred to as the "transverse direction" of the film. This orientation can be carried out on apparatus conventionally used in the art.

A representative film in its various stages of preparation is schematically illustrated in FIG. 1. It will be understood that because of the particularly high ratios of wavelength to amplitude in this representative film, the illustrations in FIG. 1 are not drawn to scale and careful note should be made of the particular measurements appearing in that figure. The film is initially extruded through an orifice having a serrated upper lip, the dimensions of which are illustrated at the top of the figure and a conventional straight lower lip, not shown. This upper lip has serrations having an amplitude of 5 mils and a wavelength of 18 mils. A typical film cast through this orifice and directed onto a quenching surface, is about 17 mils in nominal thickness and has an undulating pattern on one surface thereof, resulting from the hopper lip through which it was extruded. However, in the relatively short distance between the extrusion orifice and the impingement of the quenching surface, the amplitude of the undulations diminishes to approximately $\frac{1}{50}$ of the original amplitude of the hopper lip. Consequently, it will be noted that the wavelength of the film cast onto the quench surface is 17 mils and the amplitude is about 0.1 mil. The third illustration in FIG. 1 shows the film after having been longitudinally stretched 3.2 times. The thickness of the film is reduced to 5.0 mils, the wavelength is 15 mils, and the amplitude of the wave has been further reduced to 0.04 mil. The fourth illustration in FIG. 1 shows the film after it has been longitudinally stretched 3.2 times and transversely stretched 3.3 times, i.e., biaxially stretched 3.2 x 3.3. The final product is 1.5 mils thick and the undulating pattern of the upper surface has been so modified that the wavelength has been stretched to 60 mils with a final amplitude of 0.04 mil resulting in a ratio of wavelength to amplitude of 1500:1.

It has been found as shown by the above information that in orienting the film by longitudinal stretching, in the first instance the amplitude of the undulations, i.e., the height between the top of the ridges and the bottom of the valleys decreases by an amount that is directly proportional to the longitudinal stretch ratio. On the other hand, transverse stretching following longitudinal stretching has very little effect on the amplitude of the wave pattern even though the bulk portion of the film actually stretches in proportion to the stretch ratio increasing the wavelength by about the same proportion as the stretch ratio.

The winding characteristics of the resulting film can be conveniently analyzed with respect to the "winding slope" of the finished film, which is the speed increase possible for a specific increase in tension, while permitting slight surface adjustments of the film. An increasing winding slope is a reliable indication of increasing winding qualities of thermoplastic films other than those exhibiting an exceptionally tacky surface which, in itself, interferes with the winding of a roll.

Figure 2:
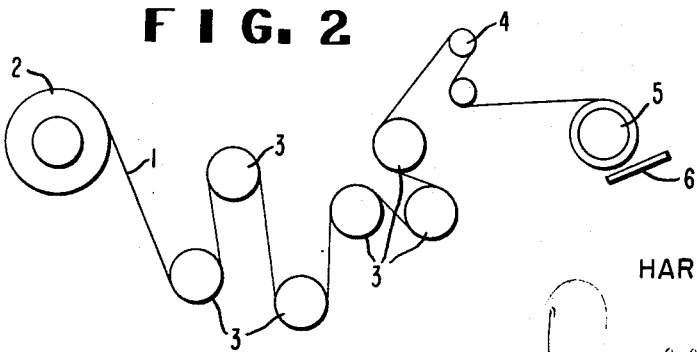
FIG. 2 is a diagrammatic illustration of apparatus employed in the evaluation of the films of the present invention.

A test of winding slope, in which the result is indicated as a numerical value, can be performed with apparatus schematically illustrated in FIG. 2. Suitable apparatus for this purpose is a Stanford doctor machine, model 148 (made by Stanford Engineering Company, Salem, Ill.) with a Reliance adjustable DC drive, an air-actuated brake, and driven pull rolls having slip-proof rubber coverings and a suitable film speed indicator. Referring to FIG. 2, film 1 from supply roll 2 is passed over a series of driven rolls 3 to the running film. Film 1 proceeds to rewind on roll 5 where feeler strip 6, which is a $\frac{1}{16}''$ x 1" x 8" strip of "Teflon"® polytetrafluoroethylene resin, is employed to detect the onset of an air bearing. The procedure employed is as follows:

(1) Thread up rewinder as shown in FIG. 2. The test film is 12 inches wide and 250 to 3000 feet long. The film is wound on a six-inch diameter core. An empty six-inch diameter T core is used on the windup. The machine is set up to operate without end discs on the winding roll and without lay-on rolls.

(2) The rewinder is run at 50 yards per minute (y.p.m.) with maximum brake and maximum winding torque.

(3) The winding torque is reduced while holding the speed constant until an air bearing is formed in the outer layers of the rewinding roll. The air bearing can be detected by manually dragging the "Teflon"® resin strip along the surface of the rewinding roll; upon air bearing formation, the outer layer of the film can be pushed axially with very little force between the "Teflon"® resin strip on the rewinding roll surface.

(4) The tension and speed at which the air bearing forms is recorded.

(5) The film is stripped from rewind core.

(6) Repeat steps 2 through 5 for speeds of 100, 150 and 200 y.p.m.

(7) Data points are plotted on graph (speed in f.p.m. vs. tension in lbs./in. width of the web).

(8) The winding slope is calculated from the average speed (f.p.m.) for the four runs divided by the average tension (lbs./in.) for the four runs expressed as Winding Slope=Average Speed/Average Tension. The units for winding slopes are f.p.m./lbs./in.

In typical films of the instant invention having a final nominal thickness of about 5 mils or less, the amplitude is typically between .01 mil and 0.5 mil and the wavelength is about from 10 to 200 mils with the ratio of wavelength to amplitude within the range of about 500–2000:1.

The final dimensions of the film will vary substantially according to the process variables involved in the manufacture of the film. For example, the wave characteristics of the final product will vary according to the degree to which the films are stretched, the number and depth of the serrations in the serrated extrusion lip, the particular thermoplastic material used, the temperature at which the film is extruded, the distance that the film must travel to the quench drum after extrusion, the temperature of the quench drum, the thickness at which the film is extruded, and other variables. It is consequently difficult to discuss with particularity all possible combinations of operating details that will lead to the particular products of the instant invention.

The wavelength and amplitude of the undulations can be measured by a "Talysurf" profilometer, commercially available from the Rank Organization of Leichester, England.

The single undulating surface of the films of the instant invention can provide winding characteristics equal to or better than those previously obtainable only through the use of fillers, brushing, or other surface treatment, and, at the same time, the instant films have at least one surface which can be substantially free of any surface irregularity. Alternatively, the films of the instant invention can be used in combination with minor amounts of filler to obtain improved winding characteristics through the additive effect of one undulating surface and quantities of filler insufficient to disturb the performance of the resulting tape.

The instant invention is further illustrated by the following examples:

EXAMPLES 1–5

Five films of polyethylene terephthalate are extruded onto an internally cooled quench roll, and the films are thereafter biaxially stretched. One of the two hopper lips at the extrusion orifice is varied, interchanging lips having various patterns of serrations. The surface undulations and the winding slopes of the oriented films are determined by the techniques described in the specification above, and the roll formation characteristics of the films are evaluated on a scale of poor, fair, good, and excellent. The details of Examples 1–5 are summarized in Table I. It may be noted that winding slope and roll formation progressively improve with decreasing ratios of wavelength/amplitude.

FIG. 3 graphically illustrates the relationship of winding slope to the ratio of wavelength to amplitude, based on data including that obtained from Examples 1–5.

If Example 3 is repeated, except that 400 p.p.m. of calcium carbonate is incorporated into the film, the winding characteristics exhibit a marked improvement.

EXAMPLES 6–8

The procedure of Examples 1–5 is repeated except that the film extruded has a substantially higher inherent surface haze, which contributes to good roll formation. Further, the film of Example 6 has no surface undulations. All three films are biaxially oriented 3.2×. The films are evaluated and the three examples summarized in Table II. An increase in winding slope with decreasing wavelength/amplitude ratio is observed.

TABLE I

| Examples | 1 | 2 | 3 | 4 | 5 |
|---|---|---|---|---|---|
| Hopper lip serrations: | | | | | |
| Height-mils | 4–5 | 7 | 5–6 | 4–5 | 5–6 |
| Width-mils | 12–14 | 4 | 12 | 12–14 | 12 |
| Radius-mils | 1 | 1 | 1 | 1 | 1 |
| Number per inch | 80 | 112 | 56 | 80 | 56 |
| Degree of biaxial stretching (in each direction) | 3.2× | 3.2× | 3.2× | 2.6× | 2.6× |
| Surface undulations: | | | | | |
| Height-mil | 0.015 | 0.015 | 0.040 | 0.025 | 0.060 |
| C–C-mil | 40 | 32 | 65 | 35 | 45 |
| Ratio:wavelength/amplitude | 2,670 | 2,130 | 1,625 | 1,400 | 750 |
| Winding slope (f.p.m./lb. tension/inch) | 138 | 147 | 170 | 213 | 237 |
| Roll formation | Poor | Poor | Good | Fair | Excel. |

TABLE II

| Examples | 6 | 7 | 8 |
|---|---|---|---|
| Hopper lip serrations: | | | |
| Height-mils | Flat | 4.5 | 9 |
| Width-mils | (Control) | 12 | 12 |
| Radius-mils | | 3 | 3 |
| Number per inch | | 80 | 56 |
| Degree of biaxial stretching (in each direction) | | | |
| Surface undulations: | | | |
| Height-mil | None | 0.015 | 0.040 |
| C–C-mil | | 40 | 55 |
| Ratio:wavelength/amplitude | | 2,670 | 1,375 |
| Winding slope (f.p.m./lb. tension/inch) | 135 | 189 | 204 |
| Roll formation | Poor | Good | Good |

I claim:

1. A thermoplastic film oriented by biaxial stretching having a nominal thickness of 5 mils or less and transversely repeating undulations that form ridges and valleys extending longitudinally along the length of the film wherein the ratio of the wavelength to amplitude of the undulations is about 500–2000:1 and the amplitude is not greater than about 10% of the thickness of the film.

2. The film of claim 1 in which the thermoplastic is a polyester.

3. The film of claim 2 in which the polyester is polyethylene terephthalate.

4. The film of claim 1 oriented by biaxial stretching at least about 2.5 times in each of two mutually perpendicular directions in the plane of the film.

5. The film of claim 1 in which the thermoplastic further comprises up to about 1200 parts per million of particulate filler.

6. The film of claim 5 in which the filler is calcium carbonate.

7. The film of claim 5 in which the filler is calcium phosphate.

References Cited
UNITED STATES PATENTS

| | | | |
|---|---|---|---|
| 2,582,294 | 1/1952 | Stober | 161—123 |
| 2,750,631 | 6/1956 | Johnson | 161—123 |
| 3,201,506 | 8/1965 | Bills | 161—402 |

MORRIS SUSSMAN, Primary Examiner

U.S. Cl. X.R.

161—402